No. 678,770. Patented July 16, 1901.
R. R. SLEWING.
ACETYLENE GAS LAMP.
(Application filed Apr. 11, 1901.)
(No Model.) 2 Sheets—Sheet 1.
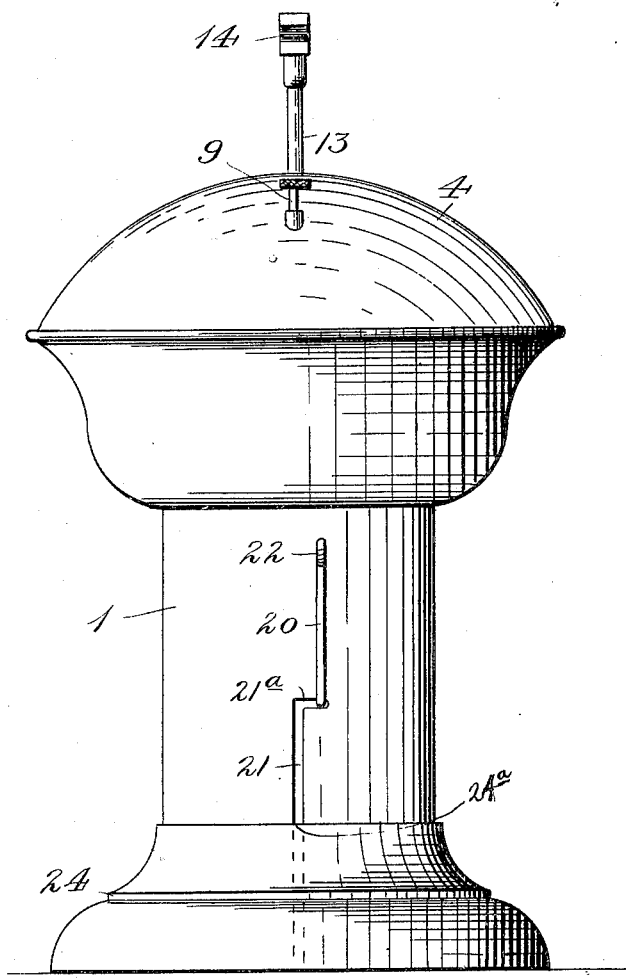
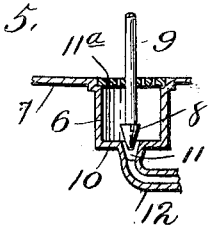
WITNESSES: INVENTOR:
Franck L. Ourand. Robert R. Slewing,
Frank G. Radelfinger Louis Bagger & Co.,
ATTORNEYS.

No. 678,770. Patented July 16, 1901.
R. R. SLEWING.
ACETYLENE GAS LAMP.
(Application filed Apr. 11, 1901.)
(No Model.) 2 Sheets—Sheet 2.
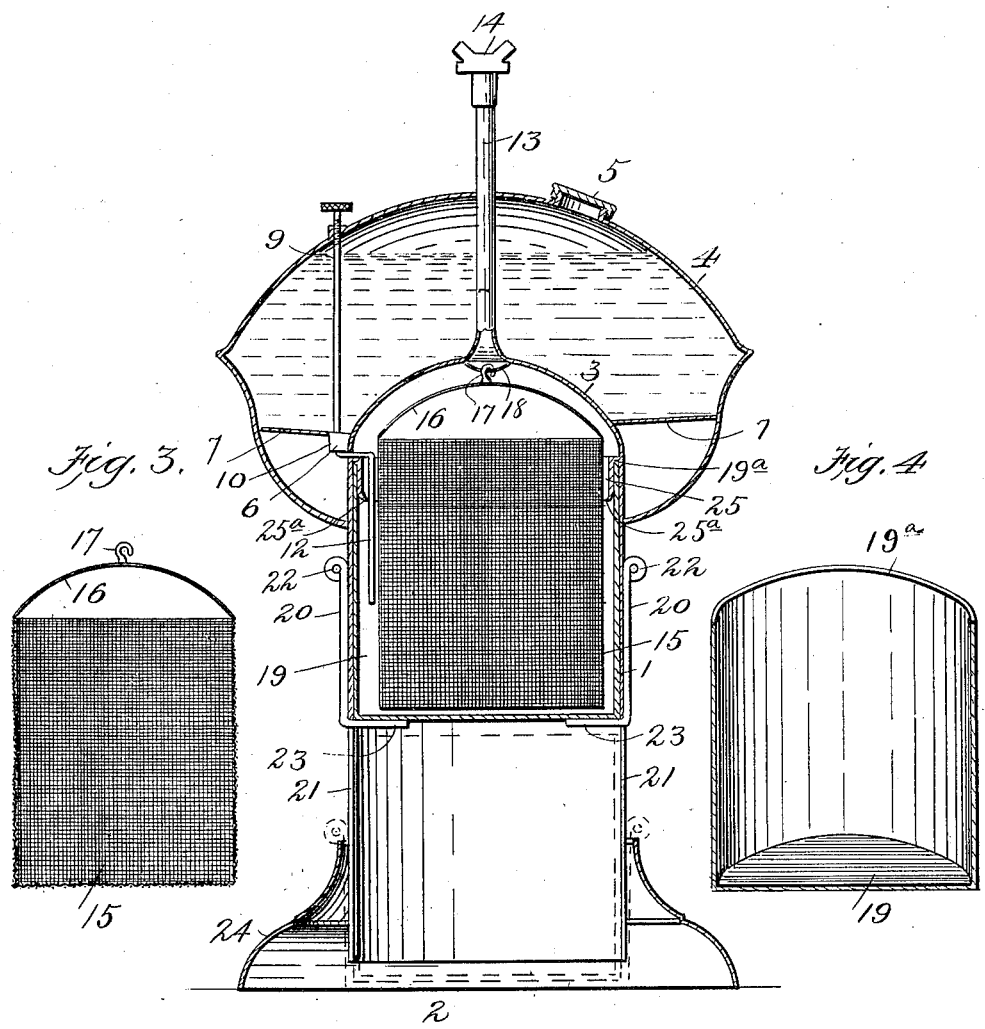

UNITED STATES PATENT OFFICE.

ROBERT R. SLEWING, OF LAJUNTA, COLORADO.

ACETYLENE-GAS LAMP.

SPECIFICATION forming part of Letters Patent No. 678,770, dated July 16, 1901.

Application filed April 11, 1901. Serial No. 55,382. (No model.)

*To all whom it may concern:*

Be it known that I, ROBERT R. SLEWING, a citizen of the United States, residing at Lajunta, in the county of Otero and State of Colorado, have invented new and useful Improvements in Acetylene-Gas Lamps, of which the following is a specification.

My invention relates to acetylene-gas lamps of the particular class in which the tank, generator, and burner are all combined; and the object of the same is to produce a lamp which can be lighted in a moment, extinguished just as quickly, and at the same time be simple in construction and economical and efficient in operation. This object and these advantages are attained by the novel construction described in this specification and claimed, and illustrated in the accompanying drawings, forming a part thereof, in which—

Figure 1 is a side elevation of the complete lamp. Fig. 2 is a vertical longitudinal section of the same. Fig. 3 is a detail of the carbid-receptacle. Fig. 4 is a detail of the water-cup. Fig. 5 is a detail of the valve.

Like numerals of reference designate like parts in the different views of the drawings.

The numeral 1 designates the casing of my lamp. This casing is cylindrical in form, open at the bottom at 2, and closed at the top by a rounded cover 3. Mounted on the top of the cover 3 is a water-reservoir 4, entirely closed, but provided with an opening covered by a screw-top 5 for the admission of water and a valve 6 for drawing off the water. The bottom 7 of the reservoir slopes toward the valve 6. The valve 6 consists of a conical plunger 8, attached to the lower end of a rod 9, passing down through the reservoir. The plunger 8 is inclosed in a casing 10, within which is located a seat 11 for the plunger. The casing 10 is perforated at $11^a$ to admit water, and a pipe 12 is joined thereto to provide an outlet for the water and to conduct it into the casing. When the plunger 8 is seated, the access of water to the pipe 12 is cut off. A jet-pipe 13 is joined to the cover 3 and passes up through the reservoir 4. This pipe 13 is surmounted by a burner 14, detachably secured thereto.

A wire-gauze carbid-receptacle 15, open at the top, is suspended by a bail 16, provided with a hook 17, which engages a cross-bar 18, spanning the mouth of the pipe 13. The carbid-receptable fits loosely the casing 1 and leaves room for a water-cup.

The water-cup 19 is open at the top and mounted to slide within the casing, which it fits very snugly. To provide means for raising and lowering the cup 19, as well as to hold it in position in the casing, a pair of catches 20 are mounted in bayonet-slots 21 in the sides of the casing. These catches 20 have thumb-pieces 22 on their upper ends and toes 23 on their lower ends, which extend under the bottom of the cup 19 and support it. The casing 1 is provided with a rim 24, extending around the bottom thereof. The catches 20 pass through apertures $24^a$ in the upper edge of the rim, which thus serve as stops to limit the downward movement of the catches by engaging the thumb-pieces 22.

The upward movement of the catches 20 is limited by the tops of the slots 21. To hold the cup suspended, the toes 22 are turned to engage the short arms $21^a$ of the slots 21. The lower position of the cup is shown in Fig. 2 in dotted lines, while the uppermost is shown in full lines. When the cup 19 is in its uppermost position, its upper edge $19^a$ is covered by an overhanging rim 25, which is slightly flared at $25^a$. This rim serves as a seal to prevent the escape of gas.

To get my lamp ready for operating, the reservoir 4 is filled with water by means of the opening closed by the screw-top 5. The water-cup 19 is next removed by lowering it to its bottom position and then turning the toes 23 around at right angles. The carbid-receptacle 15 is then disengaged and is taken out of the casing and filled with carbid. This charge will last about fifteen hours. The receptacle 15 and the cup 19 are then replaced. When it is desired to light the lamp, the water-cup 19 is raised by means of the catches 20 to its uppermost position and the valve 6 opened. The water will drip from the pipe 12 into the cup 19 and will soak up into the carbid, starting the generation of gas. The gas will ascend through the pipe 13 to the burner 14, which can then be lighted. When the lamp is to be extinguished, the water-cup 19 is lowered and the valve 6 shut. The light will almost immediately go out.

I do not wish to be limited as to details of construction, as these may be modified in many particulars without departing from the spirit of my invention.

Having thus described my invention, what I claim as new, and wish to secure by Letters Patent, is—

In a device of the class described, the combination with a casing having bayonet-slots therein, a water-reservoir surmounting said casing and provided with an outlet-valve, a carbid-receptacle inclosed in said casing, a water-cup, and catches having thumb-pieces on their upper ends and toes on their lower ends, which toes are mounted to slide in said bayonet-slots and support said cup, substantially as described.

In testimony whereof I have hereunto set my hand in presence of two subscribing witnesses.

ROBERT R. SLEWING.

Witnesses:
CARL KRUSE,
WILL BOWEN.